United States Patent
Van Der Linden et al.

(10) Patent No.: US 7,072,059 B2
(45) Date of Patent: Jul. 4, 2006

(54) METHOD AND SYSTEM FOR SUBMITTING JOBS TO A REPRODUCTION CENTER

(75) Inventors: Erwin Adrianus Richardus Van Der Linden, AB Venlo (NL); Leonard Maria Johannes Risse, GA Maasbree (NL)

(73) Assignee: Océ-Technologies B.V., MA Venlo (NL)

( * ) Notice: Subject to any disclaimer, the term of this patent is extended or adjusted under 35 U.S.C. 154(b) by 964 days.

(21) Appl. No.: 09/749,664

(22) Filed: Dec. 28, 2000

(65) Prior Publication Data

US 2001/0013947 A1    Aug. 16, 2001

(30) Foreign Application Priority Data

Jan. 4, 2000    (EP)    ................... 00200030

(51) Int. Cl.
*G06F 13/00*    (2006.01)
(52) U.S. Cl. .................. 358/1.15; 707/500; 705/26
(58) Field of Classification Search ............. 358/1.15; 707/500; 703/24
See application file for complete search history.

(56) References Cited

U.S. PATENT DOCUMENTS

| | | | |
|---|---|---|---|
| 5,105,285 A | | 4/1992 | Miyata |
| 5,450,571 A | * | 9/1995 | Rosekrans et al. ............ 703/24 |
| 5,793,938 A | * | 8/1998 | Jackson, Jr. ............... 358/1.15 |
| 5,995,723 A | * | 11/1999 | Sperry et al. ............... 358/1.15 |
| 6,058,373 A | * | 5/2000 | Blinn et al. .................... 705/26 |
| 6,388,732 B1 | * | 5/2002 | Williams et al. .............. 355/40 |
| 6,412,990 B1 | * | 7/2002 | Stoffel et al. ............... 396/599 |
| 6,469,796 B1 | * | 10/2002 | Leiman et al. ............. 358/1.15 |
| 6,587,861 B1 | * | 7/2003 | Wakai et al. ................ 715/500 |
| 6,687,018 B1 | * | 2/2004 | Leong et al. ............. 358/1.15 |
| 2002/0013742 A1 | * | 1/2002 | Shiota et al. ................. 708/26 |

FOREIGN PATENT DOCUMENTS

EP    0838774    10/1997

\* cited by examiner

*Primary Examiner*—Edward Coles
*Assistant Examiner*—Alan Rahimi
(74) *Attorney, Agent, or Firm*—Birch, Stewart, Kolasch & Birch, LLP

(57) ABSTRACT

A method for submitting jobs to a reproduction center includes electronically transmitting document data representing documents to be printed from a client to the reproduction center. A submission form description indicating print options currently available at the reproduction center is created on behalf of the reproduction center. The submission form description is suited for electronic transmission to a client and for generating a submission form at the client which is capable of being filled-in electronically by the client. An electronic document file is created upon receipt of a job request including document data from a client. The document data in the job request are stored, and the submission form description is sent to the client. Upon receipt of the submission form from the client with job specifications filled-in, the job specifications are stored in an electronic job ticket, which is linked to the document file.

38 Claims, 4 Drawing Sheets

*Fig. 3*

REPRO ORDER FORM

Customer

| | | | |
|---|---|---|---|
| Name | | Phone | |
| Company | | Order-No. | |
| Department | | Password | |
| Email-adress | | | |

Print Options

| | | | |
|---|---|---|---|
| Paper Format | A4 | Copies | 1 |
| Paper | 80 g | Color | black/white |
| | 100 g | Finsh | stapled |
| | transparent | | |

Delivery

| | | |
|---|---|---|
| fetched by customer | Date | as soon as possible |

[ Preview ]   [ Submit ]   [ Cancel ]

METHOD AND SYSTEM FOR SUBMITTING JOBS TO A REPRODUCTION CENTER

BACKGROUND OF THE INVENTION

1. Field of the Invention

The invention relates to a method and system for submitting jobs to a reproduction center.

2. Description of the Related Art

A reproduction center, e.g. a central reproduction department of a company, a commercial copy shop or the like, includes a number of print engines suitable for printing a number, typically a comparatively large number, of copies of a document. The document is submitted by a user or requester who will briefly be termed "client" hereinafter, in accordance with job specifications that have been specified by the client. The job specifications may for example include the number of copies to be printed, the desired paper format, e.g., A3 or A4, color specifications such as black and white copies or full color copies, the selection of simplex copies or duplex copies, the desired finish of the copies, e.g. stapled or bound as a booklet or brochure, and the like. These job specifications are normally indicated on an order form which is frequently called "job ticket" and which also includes an identification of the client, the destination to which the copies are to be delivered and other necessary information.

Conventionally, the document or documents forming the job are submitted to the reproduction center in the form of a hard copy on paper, accompanied by the order form, also on paper, which has been filled in by the client.

Since most documents are currently created electronically by a word processing application or the like on a multi-purpose computer, it appears to be attractive to submit these documents to the reproduction center electronically rather than on paper. For example, this can be accomplished with existing internet technology, such as by sending the order form to the reproduction center as an e-mail to which the document to be printed is attached as a document file. It is found however that this electronic submission procedure, despite its apparent advantages, has not yet become common practice. One reason may be that the electronic submission procedure is still not convenient enough and requires too much manual work on behalf of both the client and the operator in the reproduction center. On behalf of the client, it is necessary to save the document to be printed in a suitable format and to leave the desktop application with which the document has been created, in order to prepare and transmit the order form. At the reproduction center, it is necessary for the operator to suitably file the information given on order forms received from various clients and to suitably process the associated document files, without confusing the document files and the order forms respectively associated therewith.

In a certain sense, electronic job submission is practiced already in office installations consisting of a number of personal computers and one or more print engines linked together by a local area network (LAN). In such a network, it is possible for the user or client to print a document without leaving the desktop application, simply by calling up the print function of that application, so that the document will be transmitted to the printer and will be printed under the control of a printer driver installed on the computer. Such a system may even include the transmission of data through a public network, as is described for example in U.S. Pat. No. 5,105,285. This document relates to a specific image transmission system in which a hierarchic menu displayed on the monitor screen of the user enables the user to select one of various remote or local printers and to set the job specifications in accordance with the capability of the specific printer he has selected.

In these known systems, however, it is the user himself who decides which print engine is to perform the print job. For this reason, these known systems are not suitable for a reproduction center which serves a large number of clients and in which, accordingly, the print jobs must thoroughly be scheduled in order to optimally utilize the available reproduction capacity. In addition, the applicability of the known electronic job submission systems is limited by the fact that the software installed on the computer of each client must specifically be adapted to the printer or printers available within the network. Thus, if a new printer is installed in the reproduction center or new functionality is added, it would be necessary to reconfigure the pertinent software (i.e., the printer driver) in the computer of each client.

SUMMARY OF THE INVENTION

It is accordingly an object of the invention to provide an electronic job submission method and system which is convenient to handle from the view point of the client and which can be flexibly adapted to changes in the hardware configuration in the reproduction center.

According to the invention, this object is achieved by a method for submitting jobs to a reproduction center, wherein document data representing documents to be printed are electronically transmitted from a client to the reproduction center, characterized by the steps of: creating, on behalf of the reproduction center, a submission form description indicating print options currently available at the reproduction center, said submission form description being suited for electronic transmission to a client and for generating, on the side of the client, a submission form capable of being filled-in electronically by the client; upon receipt, from a client, of a job request including document data, creating an electronic document file and storing the document data therein and sending the submission form description to the client; and upon receipt of the submission form retransmitted from the client with the job specifications filled-in, storing the job specifications in an electronic job ticket, linked to said document file.

The job ticket may be created right at the receipt of the job request in the form of an empty data structure, for instance an empty entry in a data base, which is filled with the job specifications when the latter become available with the receipt of the submission form retransmitted from the client with the job specifications filled-in. Alternatively, the job ticket may be created and filled upon receipt of the submission form retransmitted from the client with the job specifications filled-in. This latter embodiment has the advantage that in the case a job is cancelled before submission, the job ticket does not have to be deleted from memory, because it does not yet exist.

If the hardware configuration, and hence the functionality available in the reproduction center, changes then these changes will be reflected by corresponding changes of the print options presented in the submission form description. Since this description is created on the side of the reproduction center and is transmitted to the client on demand, the client will always be aware of the currently available options, and it is not necessary to reconfigure the software installed on the computer of the client. Thus, a high degree of flexibility is achieved.

Moreover, since the document file and the job ticket are created and linked together automatically upon receipt of a job request, the operator in the reproduction center can readily retrieve a job ticket and the document file associated therewith without any risk of confusion, regardless of any possible time delay between the receipt of the document data and the receipt of the completed submission form.

From the viewpoint of the client, all that is necessary for submitting a reproduction job is to create a document file of the document to be printed and to send a job request, which may simply be achieved by establishing a data connection with the reproduction center. A software for automatically executing these functions can readily be implemented on any multi-purpose computer. Then, since the job request causes the reproduction center to transmit the submission form description, the client will automatically be prompted to complete this form, and it requires only a mouse click to retransmit this form to the reproduction center. Thus, the client is relieved from the burden of calling up an appropriate submission form himself, inputting an address to which this form is to be sent and to attach the document file thereto.

The data traffic between the client and the reproduction center may be controlled by protocols and software that are already available for internet or intranet applications. Further, it is possible to use functions of existing operating systems installed on many client computers for automatically creating the document file in a format suitable for printing. This offers the attractive possibility to call-up the job submission process from any desktop application, just as a normal print command.

The process steps on the side of the reproduction center are most conveniently performed by an appropriately programmed computer which will be termed a "print server". Then, from the viewpoint of the client user, the process of submitting a job to a reproduction center is quite comparable to a normal print command called up from a desktop application, with the print server playing the roll of a virtual local printer, and the submission form popping up on the user's screen under the control of the print server replacing the conventional print dialog, but with the significant difference that the appearance of the submission form can change dynamically in response to changes in the functionality available in the reproduction center.

Thus, the present invention also provides a reproduction system comprising a reproduction center including at least one print engine, and at least one client computer connected to the reproduction center through a data network, characterized by a print server storing information on print options currently available in the reproduction center and programmed to communicate, as a virtual printer, with driver software installed on the client computer, the communicating including, upon reception from a client computer of a job request including document data for printing, sending a preprogrammed job submission form description based on the currently available print options information, the driver software including, in place of a print dialog, a job submission form which is dynamically configured in response to the preprogrammed job submission form description sent by the print server.

In one embodiment, the driver software installed on the client computer comprises a generalized printer driver with which the print server is compatible. Thus, the virtual printer formed by the print server can be selected just like a physical printer and can be called up from a desktop application.

In another embodiment, the software creating the job submission form, which forms part of the driver software, is included in a web browser installed on the client computer and is capable of interpreting a program code written in a mark-up language according to a suitable internet standard and specifying a description (contents and layout) of the job submission form. It will be understood that it is this program code that is created on the side of the reproduction center and transmitted to the client through the data network, and that the description included in this program code specifies at least the print options among which the client user may select.

Preferably, the driver software on the client computer further includes a program, a so-called daemon, which is triggered by the printer driver or by the appearance of a temporary print file that has been created by this printer driver, and which causes the web browser to establish a connection with the print server in the reproduction center, so as to transmit the print file and to receive the program code for the submission form (i.e., the submission form description).

The time sequence of the data traffic between client and server may be such that, as soon as the data connection has been established, which is equivalent to the transmission of the job request, the print file representing the document data to be printed is transmitted to the print server and, preferably concurrently, the description of the job submission form is sent to the client. Since transmission of the print file and the interpretation thereof normally takes little time, the document data typically become available in the reproduction center while the client is still editing the job submission form. This makes easy implementing a soft-proofing procedure by providing on the job submission form a button allowing the user to command the transmission of a preview of the document, so that the client may check the final appearance of the document to be printed before he confirms the print order.

In general, it can be assumed that the physical location of the computer functioning as print server will be the same as that of the print engines, i.e. in the reproduction center. This, however, is not necessarily the case. If, for example, the client computers are interconnected by a broad band data network, e.g. within a company, but the reproduction center can be reached only via an external network having a smaller band width, then it is preferable to install the print server at a location where it can be connected to the broad band network. Then, the submission of print jobs and the retransmission of preview files to the clients, which frequently involve a large amount of data traffic, can be accomplished within short time by using the broad band network, whereas the operator in the reproduction center communicates with the print server over a narrow-band transmission line. This will of course lead to a certain time delay when the operator retrieves the document files and the associated job tickets from the print server, but the advantage is that these time delays will not be perceptible to the clients. On the side of the reproduction center, the time delay will normally be acceptable, because the reproduction center will not need these data, anyway, as long as all print engines are busy. Moreover, the data traffic between the print server and the reproduction center can be accelerated by using advanced data compression techniques which would not be available for the various clients. Of course, the narrow-band transmission line between the print server and the reproduction center can also be used for updating the description of the job submission form, if necessary.

It will also be understood that the reproduction center may comprise a plurality of local or remote print servers which serve various groups of clients.

In the system described above, it may be assumed that the print jobs submitted to the reproduction center are scheduled manually by an operator. To this end, an appropriate software tool may be provided for assisting the operator in administrating the print jobs. This software tool, which is called an operator console, may be installed on the same computer as the print server or on a host computer connected thereto. The document files and the job tickets created by the print server will generally be recorded in respective data bases, and the link established automatically between the document file and the associated job ticket may be implemented for example by including a reference to the document file in the job ticket and/or vice versa. The operator console may then display a list of all jobs which still need to be processed or are presently being processed, ordered for example by the requested delivery dates specified by the clients. This list will also include other information from the job tickets, such as the print options selected by the clients, so that the operator can assign each job to a print engine which has the necessary capabilities for handling this job.

In a more elaborate system, the operator console may also include a function for routing the document files to the printers specified by the operator. In this case, the job list will also include status information on each job, indicating whether or not a job has been scheduled, is waiting in a print queue, is being printed or is completed. The completed jobs may then be deleted by the operator or may be kept in the data base for accounting and statistics. Additional functionality may be added for printing a hard copy of the job ticket to be sent to the client as a confirmation or for generating and printing invoices.

In a still more extended system, the task of the operator may be automated completely. Then, a program module called scheduler will receive information on the capabilities of the available printers and information on the current status of each printer and will automatically schedule the documents present in the data base in accordance with an algorithm which makes sure that the capabilities of the available print engines are utilized in an optimal way for processing each reproduction job in due time and at lowest possible costs. Automatic accounting may also be implemented, and it is even possible that a cost estimating function is included in the submission form description, so that the cost estimate may be displayed to the client depending on the print options specified when the form is filled in. In a similar way, the client may be informed about the expected delivery time for the job.

Other possible extensions of the system relate to a print on demand function, the possibility of submitting paper jobs, and an authorization system. "Print on demand" means that a client, instead of creating a document himself, may order printed copies of documents that are stored already in the document file data base in the reproduction center.

If documents to be printed and/or submission forms are submitted on paper, these documents and forms may be scanned-in, and the contents of the submission form may automatically be entered into the job ticket data base. Thus, all jobs, regardless of whether they have been submitted on paper or online, may be scheduled and processed in a unique procedure.

An authorization system would take account for the possibility that not all end users may be entitled to submit all kinds of reproduction jobs or to submit reproduction jobs at all. In this case, the submission process would include a step of checking the authorization of the client, and, as the case may be, requesting the supervisor of the client to give the authorization.

BRIEF DESCRIPTION OF THE DRAWINGS

Several embodiments of the invention will now be described in conjunction with the drawings, in which:

FIG. 3 is a simplified example of a submission form; and

DETAILED DESCRIPTION OF THE INVENTION

Figure 1:
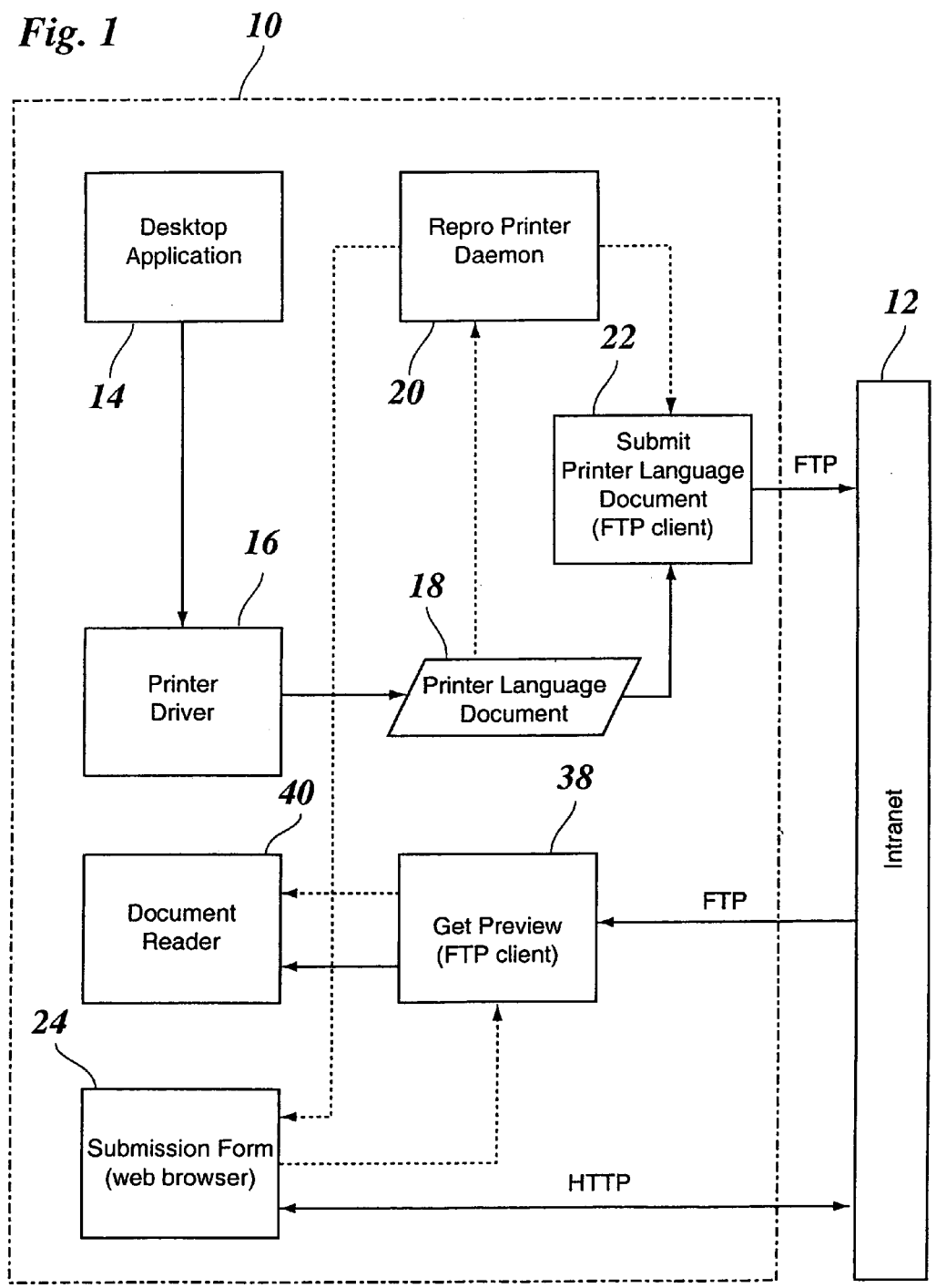
FIG. 1 is a block diagram of a part of a reproduction system implemented on the side of a client.

FIG. 1 shows a number of software components installed in a client computer 10 which is connected to a data network 12, e.g., an intranet. Through this data network 12, the client computer 10 may communicate with a reproduction center which will be described later in conjunction with FIG. 2.

The software components of the client computer 10 comprise a desktop application 14 with which the end user, i.e. the user of the client computer, can create documents which may then be submitted, as a print job, to the reproduction center for making a specified number of copies of this document according to specified job requirements.

The operating system of the client computer may be considered to be one of the commonly known operating systems for personal computers, for example, Windows NT ®. Typically, the periphery of the computer 10 includes at least one print engine, and for each of these print engines there is installed a printer driver utilizing a printer description of the corresponding printer. A specific print engine and the printer driver associated therewith may be selected on the level of the operating system or on the level of the desktop application.

The software components shown in FIG. 1 include a specific printer driver 16 which, however, is not associated with a print engine in the periphery of the client computer, but has been provided by the reproduction center. This printer driver 16 uses a standard printer description such as, for example, PPD (Postscript Printer Description). This printer description is used only for standardizing data traffic with the reproduction center and does not necessarily correspond to a physical print engine in the reproduction center.

When the end user wants to submit a print job to the reproduction center, i.e. he wants to have printed a document created with the desktop application 14, he simply uses the print function of the desktop application to activate the printer driver 16. Just as in a normal printing process, this has the effect that a temporary print file is generated in a format (i.e., a printer language) such as Postscript. This print file is shown in FIG. 1 and is termed printer language document 18.

The occurrence of the printer language document 18 in the memory of the computer 10 activates a program module (i.e., a daemon) called repro printer daemon 20. This repro printer daemon, which has also been provided by the reproduction center, gets control over the telecommunications software which in the case of windows NT ® forms part of the operating system software package. Within this telecommunications software, a module 22 called FTP client establishes a network connection with the specified address of the reproduction center and sends the printer language document 18 to the reproduction center in accordance with a standard transmission protocol such as FTP (File Transfer Protocol).

Concurrently with the transmission of the printer language document, the reproduction center sends back a piece of program code which is written for example in HTML (Hypertext Markup Language). This piece of program code, which is called a submission form description, is interpreted by the telecommunications software (e.g. web browser). As a result, a corresponding submission form 24 is displayed on the monitor screen of the client computer. This submission form 24, which may have the appearance shown in FIG. 3, allows the end user to interact with the reproduction center by entering information and commands into the submission form.

As is shown in FIG. 3, the submission form 24 has a number of fields 26 allowing the user to type-in the required personal data and, as the case may be, a password authorizing him as a customer. The submission form further includes a number of pull-down menus 28, 30 allowing the user to select among various print options that have been specified beforehand on the side of the reproduction center in accordance with the capabilities of the print engines available there. In the example shown, the pull-down menu 30 "paper" is active and shows the available paper qualities. For the other pull-down menus 28, the respective default values are shown.

The submission form 24 is also capable of dealing with mutual dependencies of the available print options. If, for example, the reproduction center has a full color printer for printing A4 documents and a black/white printer for printing A4 and A3 documents, then the pull-down menu 28 for the paper format will show both options A4 and A3 as long as the option "black/white" is selected for "color". However, as soon as the user selects the color option "full color", the format option A3 will disappear or will be marked as not available in any other way. Thus, the submission form 24 makes sure that the end user can only select a combination of options that can actually be fulfilled on the side of the reproduction center.

The submission form 24 may also include a message area (not shown in FIG. 3) in which a message from the reproduction center to the end users, for instance for drawing their attention to new or discounted services, can be displayed. Such messages may be programmed into the submission form description at the reproduction center.

The submission form 24 further includes three control buttons 32, 34 and 36 entitled "preview", "submit" and "cancel". When the user clicks on the preview button 32, a function 38 (FIG. 1) of the FTP client is called up, by which a preview showing the final appearance of the document, as it will be printed, is downloaded from the reproduction center in accordance with the FTP protocol. This preview is a version of the printer language document 18 that has been transmitted to the reproduction center and has been transformed there into a commonly used format suitable for preview purposes, such as the Adobe® PDF format (Portable Document Format). Then, on the side of the client, the function 38 will call up a document reader 40 with which the preview file can be displayed on the monitor screen, so that the user can check the final appearance of the document to be printed. Alternatively, the preview button 32 may be hidden or "greyed" initially and pop up at the moment the preview version of the document becomes available. This can be implemented by including, e.g., a JAVA applet in the submission form for polling the server.

With the submit button 34 the end user confirms that the document shall be printed with the options as selected on the submission form. With the cancel button 36 the user can indicate to the reproduction center that the reproduction job shall be cancelled. Upon depression of the submit button or the cancel button the window of the submission form 24 on the monitor screen is closed automatically, so that the user returns to the desktop application from which the print option had been called up. Alternatively, a system message for confirming the action is shown before returning to the desktop application.

The submission form 24 communicates with the reproduction center using a suitable data transmission protocol, for example HTTP (Hypertext Transfer Protocol), for transmitting the entries made by the user in the submission form to the reproduction center. The final version of the submission form, after the user has pressed the submit button, will be termed "job ticket" hereinafter. Preferably, the submission form 24 is so configured that submission of the job is refused if the user has not entered necessary (as preprogrammed in the submission form) information.

Figure 2:
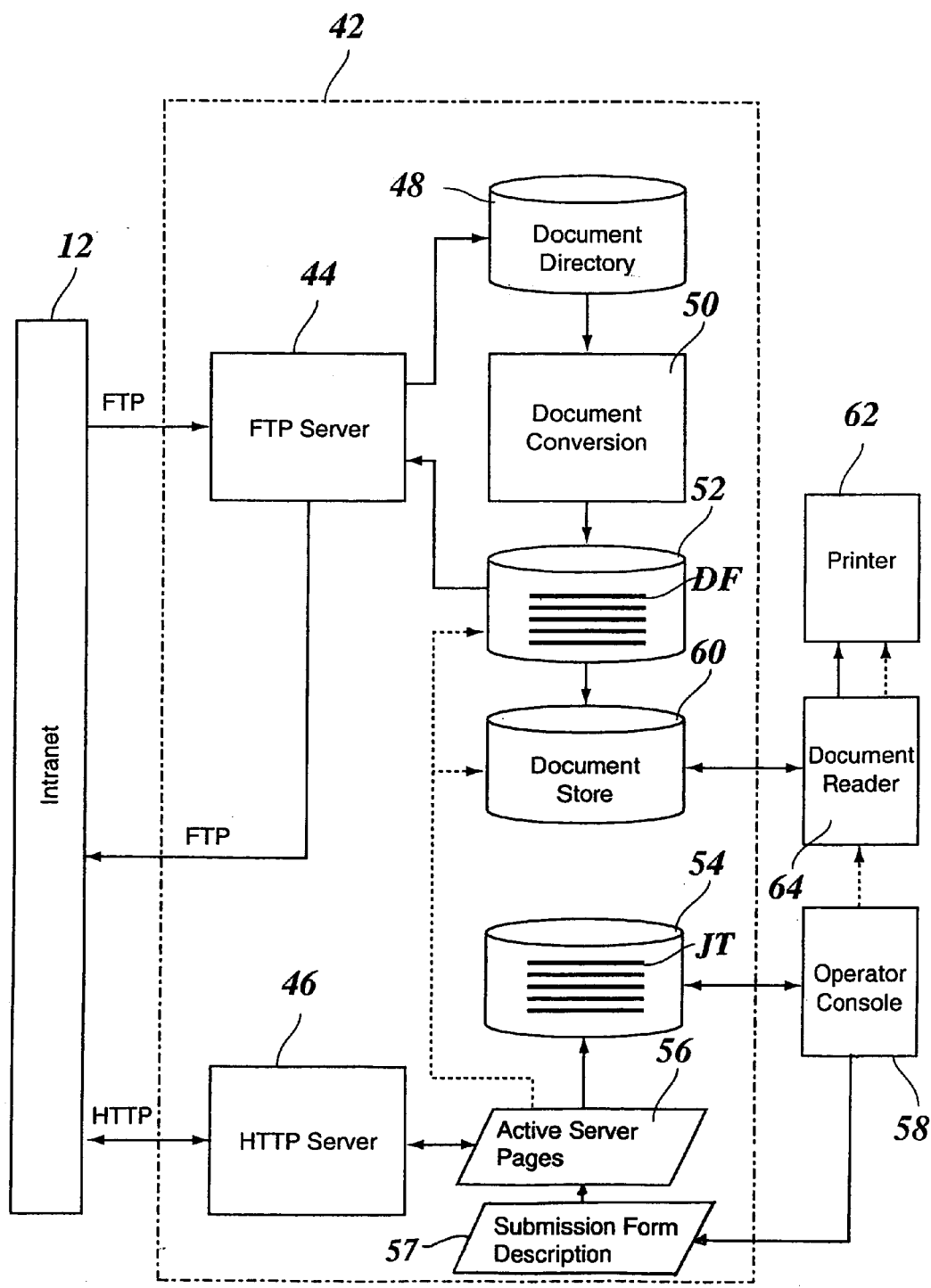
FIG. 2 is a block diagram of a supplementary part of the reproduction system implemented on the side of the reproduction center.

The job submission procedure described above will now be explained from the viewpoint of the reproduction center in conjunction with FIG. 2 which shows a print server 42 connected to the data network 12. The print server 42 may be a multi-purpose computer of which only those components have been shown which are relevant in conjunction with the invention.

The print server 42 includes or is connected to storage facilities such as disk drives for storing several data bases, and further includes the necessary software for acting as an internet server. This software includes an FTP server 44 controlling data traffic with the clients in accordance with the FTP protocol, for example, and a HTTP server 46 for controlling data traffic in accordance with the HTTP protocol.

When a printer language document 18 (e.g. Postscript document) sent by a client is received by the FTP server 44, this document is stored in a watched document directory 48. A document conversion module 50 converts this document into another format which is more suitable for processing in the reproduction center, including displaying as a softproof. In the example shown, this format is the PDF format. The PDF document thus obtained is stored in a temporary document store 52. In other words, a document file DF representing the data to be printed is created in the data base forming the temporary document store 52. Concurrently therewith, a submission form description 57 is sent by an Active Server Page 56 via the HTTP server 46 to the client. An Active Server Page is an HTML page including executable program code. There are several different Active Server Pages available in the system for handling different client requests, e.g. submission form request, job ticket data submission and job cancel request.

Since the submission form must only include the options that are available in the reproduction center, the submission form description 57 can be edited from the operator console 58 in case that the hardware equipment and hence the capabilities of the reproduction center should change. If, for example, a new printer is installed which is capable of printing on transparent overhead projector film, then the option "transparent" may be added to the pull-down menu 30 "paper", as shown in FIG. 3. Thus, the clients are always kept up to date with relation to the capabilities of the reproduction center, without any need for updating the software installed on the client computers.

When the client has filled-in the submission form 28, automatically generated from the submission form description, and clicks on the submit button, the information entered in the submission form, the job ticket data, is uploaded to the server and stored, for instance as a database record, in the job ticket store. The corresponding document file DF is transferred from the temporary document store 52 to the permanent document store 60, where it is kept at least until the print job has been completed. A reference to the document file DF is added to corresponding job ticket data in the job ticket store 54.

Before submitting the data entered into the submission form (job ticket data), the end user has the opportunity to request a preview (i.e., a softproof) of his document by pressing the preview button 32. When such a preview is requested, the document file DF is retrieved from the temporary document store 52 via the FTP client 38 and the FTP Server 44.

The job submission is completed after the job ticket data has been received by the server and the document file DF has been stored in the document store 60.

In a first embodiment the print jobs submitted to the reproduction center are scheduled manually by an operator. To this end, an appropriate software tool is provided for assisting the operator in administrating the print jobs. This software tool, which is called operator console, may be installed on the same computer as the print server or on a host computer connected thereto.

The operator console 58 displays a list of all jobs which still need to be processed or are presently being processed, ordered for example by the requested delivery dates specified by the clients. This list includes other information from the job tickets, such as the print options selected by the clients, so that the operator can assign each job to a print engine which has the necessary capabilities for handling this job. The operator console 58 includes a function for routing the document files to the printers specified by the operator. Therefor the job list includes status information on each job, indicating whether or not a job has been scheduled, is waiting in a print queue, is being printed or is completed. The completed jobs may then be deleted by the operator or may be kept in the data base for accounting and statistics.

When a print job has been received by the server and stored in the stores 60 and 54, it pops up in the list on the operator console 58, so that the operator can schedule its processing as described above. The operator console is provided with a special so-called screen saver function for times of low activity. When the screen saver is active, it either displays a preprogrammed image on the screen, which may be an entirely black image. When a new job is added to the list, and the screen saver is active, it shows a text window on the screen notifying the operator that a new job has arrived. This text is of a large font, so that the operator may notice it from a distance.

The job ticket store 54 can be browsed from the operator console 58. When a printer 62 becomes ready for printing the next job, the operator manually selects the job to be printed next from the job ticket store and commands a document reader 64 to retrieve the corresponding document file from the document store 60 and sends it to the selected printer 62 for printing the document in accordance with the options specified in the job ticket.

Figure 4:
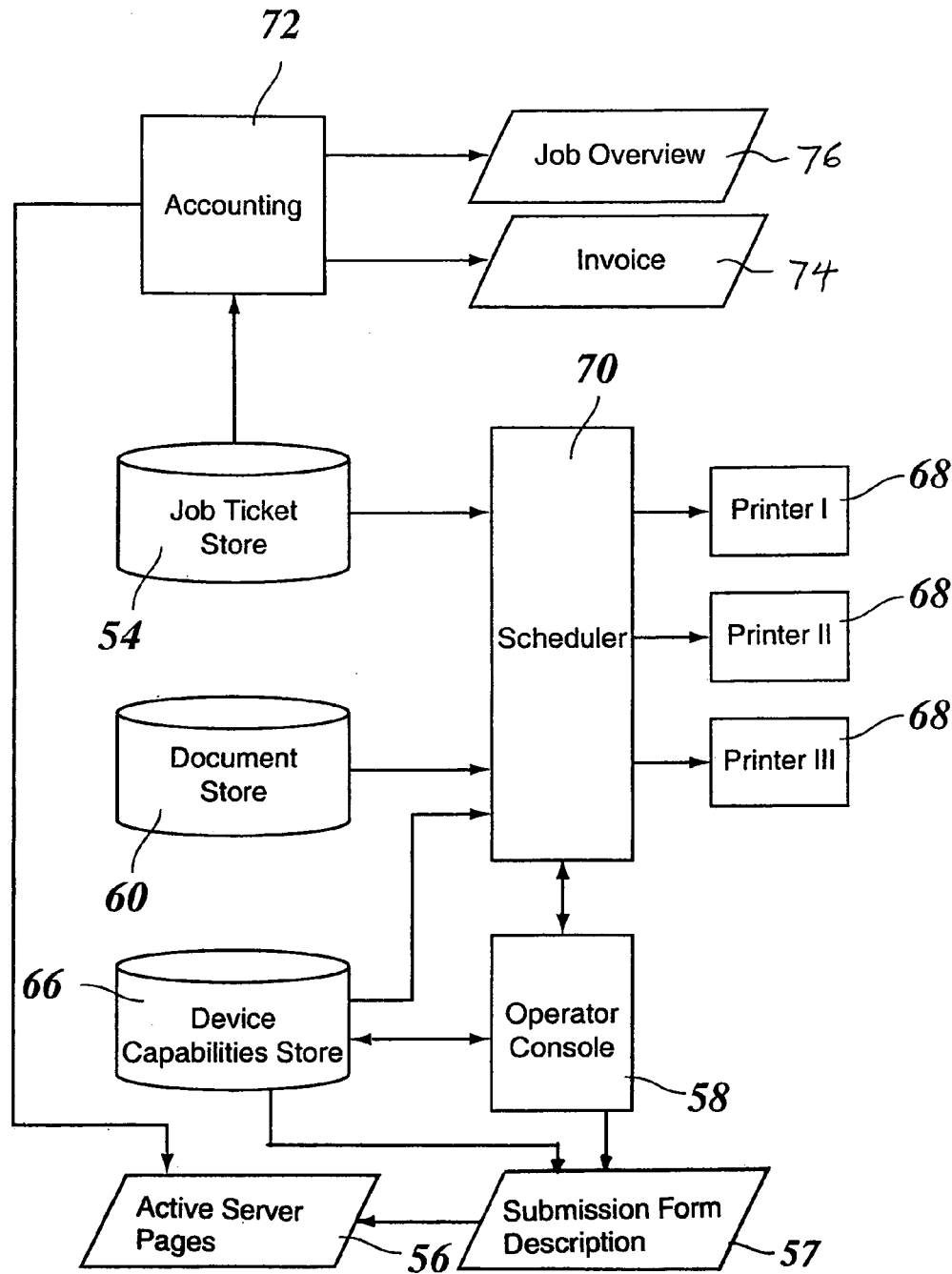
FIG. 4 is a block diagram of parts of a reproduction system according to a modified embodiment.

FIG. 4 shows the components, on the side of the reproduction center, of a reproduction system according to a modified embodiment, in which not only the job submission process but also the job handling is automated. Here, in addition to the job ticket store 54 and the document store 60 already described, a device capabilities store 66 is provided which stores, again in the form of a data base, the capabilities of all the printers 68 available in the reproduction center. The device capabilities store 66, which may be edited from the operator console 58, provides the necessary information enabling automatic update of the submission form description when the device capabilities change.

In addition, a software module called scheduler 70 receives information from the job ticket store 54 and from the device capabilities store 66 and processes the jobs present in the job ticket store 54, so that all the jobs that have been submitted are executed as expressly as possible and, if possible, within the delivery time limits specified by the clients in the submission forms. To this end, the scheduler 70 watches the status of all printers 68 and uses the information stored in the device capabilities store 66 to route each job to the printer which is capable of executing this job and, if there is any choice remaining, the printer which is capable of executing the job at the lowest possible costs. In a yet more extended embodiment, the job tickets submitted by the clients may also indicate a priority level, causing the scheduler 70 to process the jobs with the highest priority first.

An accounting module 72 uses the information in the job ticket store 54 for automatically generating invoices 74 and/or job overviews 76 indicating for example the number of jobs requested or the total costs incurred by each client within a certain accounting period.

While only specific embodiments of the invention have been described above, it will occur to a person skilled in the art that various modifications and changes are possible within the scope of the appended claims.

The invention claimed is:

1. A method for submitting print jobs from a client to a reproduction center via a network, a print job including document data and job specifications regarding processing of said document data, the method comprising the steps of:

creating, on the side of the reproduction center, a job submission form description indicating job specification options currently available at the reproduction center, said submission form description being suitable for electronic transmission via the network to a client and for generating, on the side of the client, a submission form capable of being filled-in electronically by the client;

electronically submitting a job request including document data of a document to be printed, from the client to the reproduction center via the network; and receiving said job request at the reproduction center and, in response to said job request, creating an electronic document file, storing the document data in the created electronic document file, and electronically sending the submission form description from the reproduction center to the client via the network;

receiving the submission form description at the client and locally generating a corresponding submission form;

filling in job specifications in said corresponding submission form at the client and submitting the filled-in submission form from the client to the reproduction center; and receiving the filled-in submission form at the reproduction center and storing the job specifications in an electronic job ticket linked to said document file.

2. The method according to claim 1, wherein said electronic job ticket is created upon receipt of said job request as an empty data structure, and said job specifications are stored in the job ticket upon receipt of the submission form from the client.

3. The method according to claim 1, wherein the document data are transmitted to the reproduction center and are then, at the reproduction center, transformed into a format suitable for printing on a printer that has been selected for that purpose.

4. The method according to claim 1, wherein the document data transmitted to the reproduction center are converted there into a format suitable for showing the final appearance of the printed document and are upon request transmitted in this format to the client for preview purposes.

5. The method according to claim 1, wherein internet transmission protocols are used for data traffic between the client and the reproduction center.

6. The method according to claim 5, wherein the submission form description is transmitted to the client as a program code that is interpreted at the client to electronically create the submission form and allow the client to interact with the reproduction center by entering information and commands into the submission form.

7. The method according to claim 1, further comprising:
updating, at the reproduction center, information on print capabilities of available printers in the reproduction center; and
automatically selecting one of the available printers for a print job on the basis of said information.

8. The method according to claim 1, further comprising:
automatically updating, at the reproduction center, information on print capabilities of printers available in the reproduction center; and
automatically updating said submission form description in conformity with said information.

9. A reproduction system for processing print jobs, a print job including document data and print job specifications regarding processing of said document data, the system comprising:
a reproduction center including a print engine;
a client computer having printer driver software installed and connected to the reproduction center through a data network; and
a print server programmed to communicate, as a virtual printer, with the printer driver software installed on said client computer,
the server being located at the reproduction center's side and including:
a creation module for creating a job submission form description indicating job specification options currently available at the reproduction center, said submission form description being suitable for electronic transmission via the network to a client and for generating, on the side of the client, a submission form capable of being electronically filled-in by the client with print job specifications,
a receiving module for electronically receiving a print job request including document data of a document to be printed from the driver software in the client computer through the data network and for storing said document data,
a sending module for electronically sending said job submission form description to the client computer through the data network in response to said print job request,
a second receiving module for receiving a filled-in job submission form from the client computer, and a linking module for linking the print job specifications in the received job submission form with said stored document data.

10. The reproduction system according to claim 9, wherein said driver software includes a printer driver which can be called up from a desktop application installed on the client computer.

11. The reproduction system according to claim 10, wherein the driver software further includes a daemon activated by said printer driver or by the occurrence of a file created by said printer driver, said daemon functioning to establish a data connection between the client computer and the print server.

12. The reproduction system according to claim 9, wherein the print server includes
a file transfer server for exchanging document data with the client computer,
a memory for storing document files received from the client computer in the form of a data base,
a memory for storing active server pages for communication via a server with said driver software, and
a job ticket store for storing the contents of the submission form received through said server as a data base.

13. The reproduction system according to claim 12, further comprising:
a device capabilities store storing information on the capabilities of each printer available in the reproduction center; and
a scheduler communicating with the job ticket store and the device capabilities store and automatically routing each job to a printer capable of executing the job.

14. The reproduction system according to claim 9, further comprising:
an operator console connected to said print server for editing said job submission form description.

15. The reproduction system according to claim 9, further comprising:
a device capabilities store storing information on the capabilities of each printer available in the reproduction center,
wherein said print server automatically updates said job submission form in conformity with said information in the device capabilities store.

16. The method according to claim 2, wherein the document data transmitted to the reproduction center are converted there into a format suitable for showing the final appearance of the printed document and are upon request transmitted in this format to the client for preview purposes.

17. The method according to claim 2, wherein internet transmission protocols are used for data traffic between the client and the reproduction center.

18. The method according to claim 3, wherein the document data transmitted to the reproduction center are converted there into a format suitable for showing the final appearance of the printed document and are upon request transmitted in this format to the client for preview purposes.

19. The method according to claim 3, wherein internet transmission protocols are used for data traffic between the client and the reproduction center.

20. An article of manufacture including software embodied on at least one computer-readable medium, the software comprising:
a first program code segment to cause a computer at a reproduction center's side to create a submission form description indicating print options currently available at the reproduction center, said submission form description being suitable for electronic transmission to a client and for generating, at the client, a submission form capable of being electronically filled-in by the client with print job specifications;

a second program code segment to, in response to an electronic receipt of a job request including document data of a document to be printed from the client through a network, cause the computer to create an electronic document file upon, to store the document data in the created electronic document file, and to electronically send the submission form description from the reproduction center to the client through the network; and a third program code segment to cause the computer to store job specifications in an electronic job ticket linked to said document file upon receipt of the submission form from the client with the job specifications filled-in.

21. The article according to claim 20, wherein the submission form description caused to be created by the first program code segment is transmitted to the client as a program code that is capable of interpretation at the client to electronically create the submission form and allow the client to interact with the reproduction center by entering information and commands into the submission form.

22. The article according to claim 20, further comprising:
a fourth program code segment to cause a computer to update information on print capabilities of available printers in the reproduction center.

23. The article according to claim 22, further comprising:
a fifth program code segment to cause a computer to automatically select one of the available printers for a print job on the basis of said information.

24. The article according to claim 22, further comprising:
a sixth program code segment to cause a computer to automatically update said submission form description in conformity with said information.

25. The article according to claim 20, further comprising:
a seventh program code segment to cause a computer to convert the document data transmitted to the reproduction center into a format suitable for showing the final appearance of the printed document; and
an eighth program code segment to cause a computer to transmit, upon request, the converted data in such format to the client for preview purposes.

26. The article according to claim 20, further comprising:
a ninth program code segment to cause a computer to convert the document data transmitted to the reproduction center into a format suitable for printing on a printer that has been selected for that purpose.

27. An article of manufacture including software embodied on at least one computer-readable medium, the software comprising:
a first program code segment to cause a computer at a client's side to generate a printer language document for use in generating a printed document when a print function of an application program is activated;
a second program code segment to cause the computer to establish a network connection with a reproduction center and to electronically send a job request to the reproduction center through the network connection, said job request including the printer language document and configured to trigger the reproduction center to electronically send a job submission form description back to the computer through a network connection with the computer; and
a third program code segment to cause the computer to receive said job submission form description from the reproduction center, to generate a job submission form from the job submission form description, to allow an operator to fill in job specifications in the job submission form, and to send the submission form back to the reproduction center once information has been entered therein.

28. The article according to claim 27, further comprising:
a fourth program code segment to cause a computer to request and receive from the reproduction center a file associated with the printer language document that is suitable for showing the final appearance of the printed document.

29. The article according to claim 28, further comprising:
a fifth program code segment which is activated by the fourth program code segment to cause a computer to display the file.

30. The article according to claim 27, wherein the third program code segment does not send the submission form if a user enters a cancel command.

31. The reproduction system according to claim 9, wherein the print server further includes:
a converter for converting the document data into a format suitable for showing the final appearance of the printed document, and
a transmitter for transmitting upon a request from the printer driver software the converted document data to the client computer for preview purposes.

32. The method according to claim 1, further comprising:
prior to the submitting step, generating and/or editing the document data of the document to be printed at the client using a software application running at the client.

33. The method according to claim 32, wherein in the submitting step, the job request including the document data is automatically sent from the client to the reproduction center via the network, in response to a user's selection of a print command for printing the generated and/or edited document using the software application at the client.

34. The method according to claim 1, wherein in response to a user's print command at the client for printing the document to be printed, the step of submitting the job request to the reproduction center, the step of creating the electronic document file, the step of storing the document data in the created electronic document file, and the step of sending the submission form description to the client are automatically triggered.

35. The reproduction system according to claim 9, wherein the document data of the document to be printed is generated and/or edited at the client computer using a software application running at the client computer.

36. The reproduction system according to claim 35, wherein the client computer is configured to automatically send the job request including the document data to the reproduction center through the data network, in response to a user's selection of a print command for printing the generated and/or edited document using the software application at the client computer.

37. A method for submitting jobs from a client device to a reproduction center, the method comprising:
generating, at a client device, a document to be printed;
automatically transmitting the generated document from the client device to the reproduction center device via a network, in response to a user's print command at the client device;
storing the received document in the reproduction center device;
automatically transmitting submission form software from the reproduction center device to the client device via the network upon receipt of the document by the reproduction center device;

generating an electronic form to be filled by a user, by executing the submission form software, the electronic form being tailored to correspond with capabilities of the reproduction center device;

receiving, by the reproduction center device, the electronic form filled by the user, and executing the user's print command based on information filled out on the electronic form as an automatic response to the receipt of the filled electronic form.

38. The method according to claim 37, wherein the user's print command is generated at the client device by selecting a print function of an application program running on the client device.

* * * * *